United States Patent Office 2,719,852
Patented Oct. 4, 1955

2,719,852
TRIPHENYLMETHANE DERIVATIVES

Walther Retter, Leverkusen-Bayerwerk, Germany, assignor to Farbenfabriken Bayer Aktiengesellschaft, Leverkusen, Germany, a corporation of Germany No Drawing. Application May 24, 1952, Serial No. 289,875

Claims priority, application Germany May 30, 1951

6 Claims. (Cl. 260—340.3)

The present invention relates to new triphenylmethane derivatives; more particularly it relates to triphenylmethane derivatives containing sulfonic acid groups. The invention further relates to processes of making these new triphenylmethane derivatives, and another object of the present invention is a process for protecting keratin containing materials, such as wool, furs, feathers and the like, from attack by moths and similar pests.

In German Patents Nos. 595,106; 604,980 and 618,033 the manufacture and use of o-alkoxydi- and -triphenylmethanes as well as of o-aralkoxydi- and -triphenylmethanes are described. In particular the sulfonic acids of these compounds have proved suitable for protecting keratin containing materials, such as wool, feathers, furs and the like, from attack by moth larvae and similar textile pests. These alkoxy and aralkoxy compounds show, in comparison with the corresponding known hydroxy compounds, the advantage of an increased fastness to washing and to light of the materials treated therewith. The general application of these valuable compounds is, however, prevented by their—for practical purposes—insufficient solubility in neutral or acid baths; especially they proved to be sensitive to the salts causing hardness of water with which they form precipitates.

I have now found that the new triphenylmethane derivatives of the general formula following below have all the advantages of the known compounds, but avoid their drawbacks. The new compounds correspond to the formula:

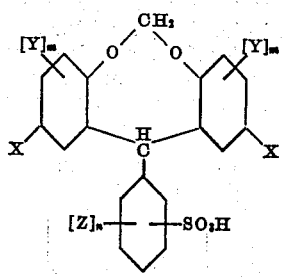

In this formula X, Y and Z stand for halogen, trifluoromethyl, alkyl, aralkyl, alkoxy, amino or acylamino radicals, Y and Z may stand also for hydrogen, and $m$ and $n$ are integers.

The new compounds may be obtained by reacting in alkaline medium 0.0'-dihydroxy triphenylmethanes of the general formula:

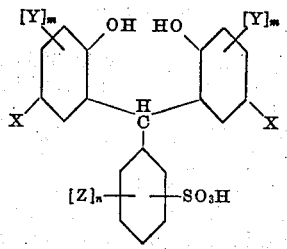

wherein X, Y and Z, $m$ and $n$ have the same meaning as above, with dihalogenomethanes. Preferably dichloro or dibromomethane are used in this reaction. It is expedient to carry through the reaction at elevated temperature, e. g. at about 100° C., and, if necessary, in a closed vessel. A modification of the above process consists in starting from the mentioned dihydroxy triphenylmethanes being, however, free from sulfonic acid groups, and in sulfonating the methylene ethers obtained by the reaction with dihalogeno methanes. The compounds used as starting materials and the processes of making the same are known e. g. from the German Patents Nos. 503,256; 530,219; 535,152; 541,629; 544,293 and the above mentioned 604,980.

I have also prepared in an analogous manner the corresponding ethers with longer alkylene chains, e. g. the ethylene, ethylidene, propylene and butylene ethers. These ethers show the same properties as the known above mentioned alkyl and aralkyl ethers and are, therefore, not sufficiently soluble for practical purposes.

The new compounds can be applied to the materials to be protected in the usual manner of a dyeing process from a neutral or acid bath. They impart to the keratin containing materials thus treated a protection against attack by textile pests which is equal in quality to the one obtained by the known mentioned alkyl and aralkyl ethers, this also with respect to the fastness to washing and to light. They are, however, distinguished from these known compounds by their excellent solubility in the baths in which property they even excel the known non-etherified dihydroxy compounds.

The following examples illustrate the invention without, however, restricting it thereto:

Example 1

1 mol of the sodium salt of 2.2'-dihydroxy-3.5.3'.5'.4"-pentachloro triphenylmethane-2"-sulfonic acid is dissolved in 2 to 2.5 mol of diluted caustic soda solution and, after adding 1 to 1.5 mol of methylene chloride, stirred for 5 to 10 hours at about 100° C. The reaction is complete when the pressure remains constant. The separated colorless methylene ether compound of the following formula:

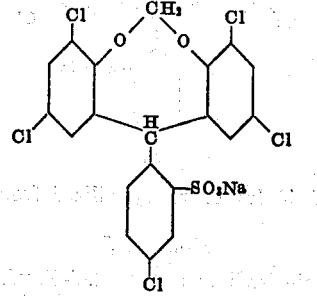

is sucked off, if desired re-crystallized from water, and dried.

By using in the above example the corresponding quantity of methylene bromide, and by weakly boiling the reaction mixture with reflux, the same compound can be obtained.

Example 2

1 mol of 2.2'-dihydroxy-3.5.3'.5'.4"-pentachloro triphenylmethane is dissolved in 2 to 2.5 mol of diluted caustic soda solution and, after adding 1 to 1.5 mol of methylene bromide, stirred for 5 to 10 hours at about 100° C. while refluxing. The separated methylene ether compound is sucked off, washed with water, and dried. The dry product is dissolved with five times its quantity of sulfuric acid monohydrate and, after adding so much strong oleum that 10 to 15 per cent of free SO₃ are present, stirred at room temperature until a test sample is clearly soluble in sodium carbonate. The solution is then poured on ice and the separated sulfonation product is sucked off. For a further purification it is dissolved in a little hot water and salted out again. The compound thus obtained is isomeric to that according to Example 1; the sulfonic acid group stands in 3″-position.

*Example 3*

1 mol of the sodium salt of 2.2′-dihydroxy-3.5.3′.5′-tetrachloro triphenylmethane-2″-sulfonic acid is dissolved in 2 to 2.5 mol of diluted caustic soda solution and, after adding 1 to 2 mol of methylene chloride, stirred for 10 to 20 hours at about 100° C. in a closed vessel. The reaction is complete when the pressure remains constant. The separated colorless methylene ether compound according to the formula:

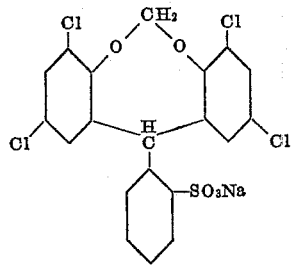

is sucked off, if desired re-crystallized from water, and dried.

*Example 4*

1 mol of the sodium salt of 2.2′-dihydroxy-5.5′.4″-trichloro triphenylmethane-2″-sulfonic acid is dissolved in 2 to 2.5 mol of diluted caustic soda solution and, after adding 1 to 2 mol of methylene chloride, stirred for 10 to 20 hours at about 100° C. in a closed vessel. The reaction is complete when the pressure remains constant. The separated colorless methylene ether compound according to the formula:

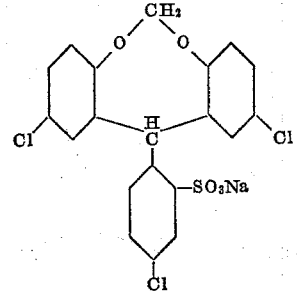

is sucked off, if desired re-crystallized from water, and dried.

*Example 5*

1 mol of the sodium salt of 2.2′-dihydroxy-3.5.3′.5′-tetrachloro-4″-amino-triphenylmethane-2″-sulfonic acid is reacted with 1 to 2 mol of methylene chloride and the reaction product worked up as described in Example 4. The separated colorless methylene ether compound corresponds to the formula:

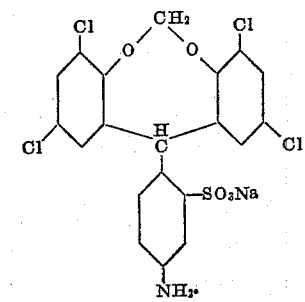

*Example 6*

1 mol of the amino compound, as obtained according to Example 5, is acetylated by several hours heating it with acetic anhydride to form the acetylamino compound of the following formula:

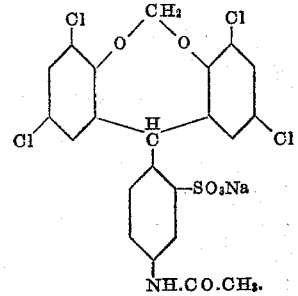

*Example 7*

1 mol of the sodium salt of 2.2′-dihydroxy-3.3′-dimethyl-5.5′.4″-trichloro-triphenylmethane - 2″ - sulfonic acid is dissolved in 2 to 2.5 mol of diluted caustic soda solution and, after adding 1 to 2 mol of methylene chloride, stirred for 10 to 20 hours at about 100° C. The reaction is complete when the pressure remains constant. The separated colorless methylene ether compound according to the formula:

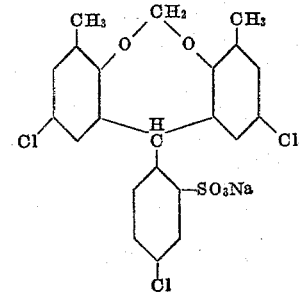

is sucked off, if desired re-crystallized from water, and dried.

*Example 8*

As described in the previous examples, 1 mol of the sodium salt of 2.2′-dihydroxy-3.5.6.3′.5′.6′.4″-heptachloro triphenylmethane-2″-sulfonic acid is reacted with 1 to 2 mol of methylene chloride and worked up. The separated colorless methylene ether compound corresponds to the formula:

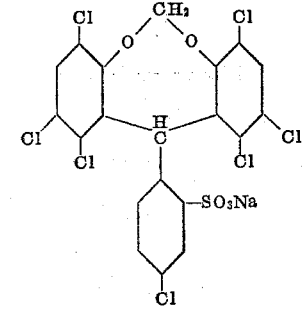

*Example 9*

1 mol of 2.2′-dihydroxy-3.5.3′.5′-tetrachloro-4″-methoxy triphenylmethane are dissolved in 2 to 2.5 mol of diluted caustic soda solution and, after adding 1 to 2 mol of methylene chloride, stirred for 10 to 20 hours at about 100° C. in a closed vessel. The separated methylene ether compound is sucked off, washed with water, and dried. The dry product is sulfonated in the manner described in Example 2 and worked up as shown there. The separated sulfonation product according to the formula:

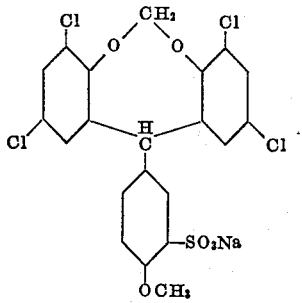

is sucked off. For the further purification it is dissolved in some hot water and salted out again.

*Example 10*

100 kilograms of material are treated like in a dyeing process, either in a neutral bath or with the addition of acid, with 1.5 kilograms of the methylene ether obtained according to Example 1, if desired with the addition of a dyestuff which is able to go on the fibre together with the protecting agent. Besides, also other suitable chemicals can be added to the bath.

The material treated in this manner is protected against attacks by textile pests.

I claim:

1. As new products the compounds corresponding in the free state to the general formula:

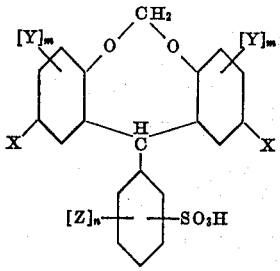

wherein X is halogen; Y is a member of the group consisting of halogen and lower alkyl; and Z is a member of the group consisting of halogen, amino, acylamino and lower alkoxy, $m$ stands for an integer from 0 to 2, and $n$ for an integer from 0 to 2.

2. The compounds as claimed in claim 1 wherein X, Y and Z each stand for halogen.

3. The compounds as claimed in claim 1 wherein X and Y each stand for halogen, and Z stands for amino.

4. The compounds as claimed in claim 1 wherein X and Y each stand for halogen and Z stands for acylamino.

5. The compounds as claimed in claim 1 wherein X and Z each stand for halogen and Y stands for alkyl.

6. The compounds as claimed in claim 1 wherein X and Y each stand for halogen and Z stands for alkoxy.

References Cited in the file of this patent
UNITED STATES PATENTS

| | | |
|---|---|---|
| 1,948,894 | Weiler et al. | Feb. 27, 1934 |
| 2,116,827 | Foldi | May 10, 1938 |
| 2,218,663 | Stallmann | Oct. 22, 1940 |
| 2,515,723 | Max et al. | July 18, 1950 |